United States Patent Office

3,020,239
Patented Feb. 6, 1962

---

3,020,239
REMOVAL OF VANADIUM FROM A SUPPORTED MOLYBDENUM-CONTAINING CATALYST
Richard A. Flinn and Meredith M. Stewart, Penn Hills, Pa., assignors to Gulf Research & Development Company, Pittsburgh, Pa., a corporation of Delaware
No Drawing. Filed Dec. 4, 1958, Ser. No. 778,084
5 Claims. (Cl. 252—413)

This invention relates to a process for the removal of vanadium from compositions containing it and more particularly this invention relates to a process for the removal of vanadium from molybdenum containing compositions.

Hydrocarbon oil treating catalysts are among the types of compositions frequently requiring treatment for the removal of vanadium. Vanadium is present in various crudes and their fractions to an extent that it tends to deposit upon catalysts employed for their treatment, thereby tending to seriously contaminate these catalysts. Vanadium is a particularly deleterious contaminant upon such catalysts since it drastically alters their activity and selectivity. For example, in cracking processes, when vanadium accumulates on the surface of the catalyst the catalyst produces a smaller proportion of hydrocarbons in the gasoline boiling range and produces a greatly increased amount of carbon and coke. Likewise, in various hydrogenation processes the deposition of vanadium upon the catalyst serves to reduce its activity and selectivity. Not only does the deposition of vanadium upon a catalyst alter its activity and selectivity but the deposition of excessive amounts of vanadium from charge stocks results in plugging of catalyst pores thereby greatly reducing the available catalytic surface area.

It is known that hydrogenation processes, especially hydrogenation processes directed to the removal of sulfur from a charge stock, advantageously employ molybdenum-containing catalysts. For example, a particularly desirable hydrogenation catalyst comprises the oxides of nickel and molybdenum supported upon a carrier. Molybdena supported upon alumina is another active hydrogenation catalyst. Such molybdenum-containing catalysts are particularly difficult to regenerate when they become contaminated with vanadium because the solvents used for the extraction of vanadium from the surface of catalysts also remove appreciable quantities of molybdenum.

We have now discovered that aqueous solutions of glycolic acid can be employed for the removal of vanadium from molybdenum containing compositions whereby a substantial proportion of the vanadium contaminant is removed while substantially completely avoiding the removal of any of the molybdenum content of the composition. Our discovery has particular application to the removal of vanadium from catalysts containing molybdenum as an active constituent. This discovery is particularly surprising since hydroxy acids and other compounds similar in structure to glycolic acid which exert a solvent power for the removal of vanadium from catalytic materials also concomitantly exhibit an appreciable solvent power for the removal of molybdenum and are therefore highly unsuitable for use in certain applications such as in reactivating hydrogenation catalysts containing molybdenum as an active constituent.

The glycolic acid is employed in aqueous solution having a glycolic acid concentration of about 0.1 weight percent to 50 weight percent. Preferably, a glycolic acid concentration of about 0.1 weight percent to 1.0 weight percent is employed. The preferred range of glycolic acid concentration is employed where the composition being treated contains aluminum since glycolic acid at concentrations above about 1.0 weight percent leaches aluminum. Aluminum, as alumina, is commonly present in hydrogenation catalysts as a supporting material. Silica-alumina is employed as a support in hydrogenation operations in which a certain degree of concomitant cracking is desired. When the preferred concentration range of glycolic acid is employed substantially none of the alumina content of the catalyst is removed in the washing operation whereas, when higher concentrations are employed, substantial losses of alumina occur. For example, when a 5 percent glycolic acid solution is employed, as much as 10 percent loss of alumina occurs. This loss of alumina is particularly harmful when a silica-alumina support is employed for the purpose of imparting cracking activity to the molybdenum-containing hydrogenation catalyst since a reduction in the proportion of alumina in alumina-silica cracking catalysts can result in a reduction in cracking activity.

The glycolic acid treatment of vanadium contaminated compositions can be either a batch or continuous operation. Preferably the operation is continuous.

The glycolic acid washing temperaure should be between about 30° F. and 150° F. generally and preferably the washing temperature should be between about 50° F. and 100° F. The rate of vanadium removal decreases below 50° F. while temperatures above 100° F. increase the rate of aluminum removal.

The glycolic acid washing treatment should proceed for at least a half hour and preferably between about one-half hour and one hour. After about one-half hour to one hour the rate of vanadium removal decreases sharply. Generally, about half of the vanadium present which can be removed by the acid washing operation is removed in the first one-half hour to one hour of washing, while extending the washing period for as much as 24 to 48 hours will not even double the amount of vanadium removal achieved during this initial period.

Both the overall rate and total quantity of vanadium removal can be increased by interrupting the glycolic acid wash after the rate of vanadium removal has fallen off sharply, i.e., after about one-half hour to one hour, and subjecting the composition being treated to a rinsing with water to free it of glycolic acid and then returning to a second period of washing with glycolic acid. When the acid washing is interrupted and the composition freed of glycolic acid solution in this manner, a second period of rapid vanadium removal occurs with the resumption of the glycolic acid wash. For example, two one-half hour acid washings separated by a water rinse to free the composition of glycolic acid will result in about a 25 percent greater removal of vanadium from the composition than can be achieved by one hour of continuous acid washing.

A substantial further increase in the total quantity of vanadium which can be removed according to this invention is achieved by including a drying step in the treatment cycle. This drying step is inserted between the water rinse and the resumption of the acid wash. The improvement incident to the employment of the water rinse alone is increased about 50 percent by drying the composition being treated following the water rinse step and prior to the resumption of the glycolic acid wash. Therefore, two one-half hour acid washings separated by a water rinse and drying sequence will result in almost a 40 percent greater removal of vanadium from the composition than can be achieved by one hour of uninterrupted acid washing.

The water rinse step should proceed for about two or three minutes. Increasing the duration of the water rinse for as much as three hours has no appreciable effect. The drying step is carried at temperatures in the vicinity of the boiling point of water and the duration of the drying step depends upon the particular temperature in this vicinity which is employed. For example, at a drying temperature of 250° F. about two hours are required to dry the composition. Drying temperatures should be limited to the vicinity of the boiling point of water since rapid evaporation of the water present can cause fracturing of the material being treated. The drying step need not proceed beyond the point at which the moisture content begins to level off as indicated by a relatively constant composition weight.

The combination of water rinsing and drying is especially valuable where the composition being treated is a catalyst which is employed in a process in which it is particularly important to reduce the vanadium content of the catalyst to as low a value as can be achieved. Repeated cycles of glycolic acid washing, water rinsing and drying results in a catalyst having a lower vanadium content than can be achieved by repeated cycles of glycolic acid washing and water rinsing without drying or by extended uninterrupted glycolic acid washing alone.

Tests were made to illustrate the superiority of glycolic acid in the treatment of molybdenum-containing compositions as compared to the use of other solvents for the removal of vanadium from such compositions. In these tests, illustrated in Table 1, portions of a sample composition comprising nickel, molybdenum, alumina and vanadium containing 1.91 percent by weight of vanadium and 7.55 percent by weight of molybdenum were treated with various solvents for the removal of vanadium. All the vanadium solvents employed were tested under standard conditions which included a washing time of four hours and a washing temperature of 80° F. In each test shown, 15 grams of the sample was washed with 1000 cc. of solution which was recycled at a rate of 500 cc. per hour. Table 1 shows the vanadium and molybdenum content of each sample after treatment with the particular solvent employed and also shows the percent removal of these metals from the respective samples following treatment with the designated solvent. For purposes of comparison the vanadium solvents shown in the table include hydroxy acids other than glycolic acid, i.e., lactic acid, tartaric acid and citric acid; a monocarboxylic acid i.e., acetic acid; dicarboxylic acids, i.e., oxalic acid, malonic acid and succinic acid; and an aromatic acid, i.e., phthalic acid.

TABLE 1

*Effect of washing with various solvents of a composition comprising 1.91 weight percent vanadium and 7.55 weight percent molybdenum*

| Washing Treatment | | Vanadium and Molybdenum Content After Washing, Percent by Weight | | Removal During Washing, Percent | |
| --- | --- | --- | --- | --- | --- |
| Solvent | Solvent Concentration, Percent by Weight | Vanadium | Molybdenum | Vanadium | Molybdenum |
| Phthalic Acid | 0.5 | 1.19 | 6.47 | 37.7 | 14.3 |
| Malonic Acid | 1.0 | 1.10 | 5.64 | 42.4 | 25.3 |
| Succinic Acid | 1.0 | 1.34 | 6.86 | 29.8 | 9.1 |
| Glycolic Acid | 1.0 | 1.17 | 8.01 | 38.7 | 0.0 |
| Lactic Acid | 1.0 | 1.11 | 4.79 | 41.9 | 36.6 |
| Salicylic Acid | 0.15 | 1.25 | 5.40 | 34.6 | 28.5 |
| Citric Acid | 1.0 | 1.05 | 6.60 | 45.0 | 12.6 |
| Acetic Acid | 1.0 | 1.31 | 6.89 | 31.4 | 8.7 |
| Oxalic Acid | 1.0 | 1.05 | 3.14 | 45.0 | 58.4 |
| Tartaric Acid | 1.0 | 1.17 | 3.61 | 38.8 | 52.2 |

Table 1 shows that glycolic acid is the only solvent which does not remove the molybdenum present. It is noted that the percent of molybdenum in the glycolic acid washed material is greater than the percent of molybdenum in the unwashed composition. This is due to the fact that the removal of elements other than molybdenum results in a proportional increase in the amount of molybdenum present. In addition to the fact that glycolic acid does not remove molybdenum from the composition, Table 1 shows that it compares favorably with the other solvents employed in the removal of vanadium.

It is noted that glycolic acid removes other metal contaminants, such as sodium and iron, in addition to vanadium. Although glycolic acid also removes a slight amount of nickel concomitantly with the removal of vanadium, this is not objectionable when a catalyst is treated in accordance with the process of this invention since most crudes contain nickel which becomes deposited upon the surface of the catalyst during hydrocarbon treating processes. For example, a Boscan crude from Venezuela was found to contain 107 parts per million of nickel in addition to 1160 parts per million of vanadium. Therefore, any nickel removal is readily replaced by the oil passed over the catalyst during processing and the slight tendency to remove nickel serves to advantageously moderate the accumulation of nickel.

Table 2 illustrates the advantage to be achieved in a typical molybdenum catalyzed hydrogenation process by treating the catalyst with glycolic acid for the removal of vanadium rather than employing a vanadium solvent which also removes molybdenum. Table 2 shows the effect on hydrodesulfurization activity of a reduction in molybdenum content of a nickel-cobalt-molybdenum-alumina catalyst initially containing 0.2 mole of cobalt to 1 mole of molybdenum and 0.1 mole of nickel to 1 mole of molybdenum. The data in Table 2 was taken in the treatment of a light catalytic gas oil containing 1.39 percent sulfur at 600° F., 600 pounds per square inch gauge, 6.0 volumes of charge per hour per volume of catalyst and 4000 standard cubic feet of hydrogen per barrel.

TABLE 2

| Molybdenum, Percent by Weight | Percent Desulfurization |
| --- | --- |
| 8.0 | 63.5 |
| 6.2 | 55.5 |
| 4.3 | 52.0 |
| 2.9 | 49.5 |

Table 2 shows that removal of molybdenum from the hydrodesulfurization catalyst results in appreciable reduction in the activity of the catalyst. As shown, the reduction in molybdenum content from 8 percent to 2.9 percent reduces the percent desulfurization activity of the catalyst from 63.5 to 49.5.

EXAMPLE 1

A composition comprising 7.6 percent molybdenum and 1.9 percent vanadium supported upon an Alcoa F–10 grade alumina is treated with a 1.0 weight percent aqueous solution of glycolic acid at 80° F. After one hour of continuous washing about 40 percent of the vanadium and none of the molybdenum present is removed. After 48 hours of continuous washing the vanadium removal increases to about 70 percent, no removal of molybdenum occurring during the entire period. It is therefore seen that the removal of vanadium during the first hour of washing is greater than the removal of vanadium occurring during the subsequent 47 hours of washing.

EXAMPLE 2

A material having the composition stated in Example 1 is washed with a 1.0 weight percent aqueous solution of glycolic acid at 80° F. for one-half hour after which time it is rinsed with distilled water for several minutes and washed again with the same acid solution for one-half hour. The total washing period of one hour removes about 50 percent of the vanadium present without removing any molybdenum. Therefore, interrupting the washing with a water rinse step achieves 25 percent more vanadium removal than continuous washing for a similar period.

EXAMPLE 3

A material having the composition shown in Example 1 is washed with a 1.0 weight percent aqueous glycolic acid solution at 80° F. for one-half hour. It is then rinsed with distilled water for several minutes and dried at 250° F. for about two hours. It is then subjected to another half-hour wash with the same glycolic acid solution which was initially used. In this case, about 55 percent of the vanadium present is removed without removing any molybdenum. Therefore, rinsing and drying the catalyst increases by about 50 percent the increase in vanadium removal which is realized by rinsing without drying.

Various changes and modifications may be made in this invention without departing from the spirit or scope thereof as defined in the following claims:

We claim:

1. A process for the removal of vanadium from a catalyst composition which contains molybdenum supported on a carrier, said removal being accomplished without substantial concomitant removal of molybdenum from said catalyst composition, which process comprises washing said catalyst composition for a period of at least about one-half hour with an aqueous solution of between about 0.1 and 50 weight percent glycolic acid at a temperature between about 30° and 150° F.

2. A process for the removal of vanadium from a catalyst composition which contains molybdenum supported on a carrier selected from the group consisting of alumina and silica-alumina, said removal being accomplished without substantial concomitant removal of molybdenum from said catalyst composition, which process comprises washing said catalyst composition for a period of at least about one-half hour with an aqueous solution of between about 0.1 to 50 weight percent glycolic acid at a temperature between about 30° and 150° F.

3. A process for the removal of vanadium from a catalyst composition which contains molybdenum supported on an alumina carrier, said removal being accomplished without substantial concomitant removal of molybdenum and alumina from said catalyst composition, which process comprises washing said catalyst composition for a period of at least about one-half hour with an aqueous solution of between about 0.1 and 1 weight percent glycolic acid at a temperature between about 30° and 150° F.

4. A process for the removal of vanadium from a catalyst composition which contains molybdenum supported on a carrier, said removal being accomplished without substantial concomitant removal of molybdenum from said catalyst composition, which process comprises washing said catalyst composition for a period of at least about one-half hour with an aqueous solution of between about 0.1 and 50 weight percent glycolic acid at a temperature between about 30° and 150° F., rinsing said catalyst composition with water to remove substantially all the glycolic acid from the surface of the catalyst composition, drying said composition and again washing said composition for a period of at least about one-half hour with an aqueous solution of between about 0.1 and 50 weight percent glycolic acid at a temperature between about 30° and 150° F.

5. A process for the removal of vanadium from a catalyst composition which contains molybdenum supported on a carrier, said removal being accomplished without substantial concomitant removal of molybdenum from said catalyst composition, which process comprises washing said catalyst composition for a period of between about one-half and 1 hour with an aqueous solution of between about 0.1 and 50 weight percent glycolic acid at a temperature between about 30° and 150° F.

References Cited in the file of this patent

UNITED STATES PATENTS

| | | |
|---|---|---|
| 2,380,731 | Drake et al. | July 31, 1945 |
| 2,651,617 | Schmerling | Sept. 8, 1953 |
| 2,668,798 | Plank | Feb. 9, 1954 |
| 2,773,839 | Stover et al. | Dec. 11, 1956 |